(12) United States Patent
Demeure

(10) Patent No.: US 7,181,719 B2
(45) Date of Patent: Feb. 20, 2007

(54) GRAPHIC ACQUISITION METHOD FOR PLACEMENT OF SIGNAL PROCESSING APPLICATIONS

(75) Inventor: Alain Demeure, Nice (FR)

(73) Assignee: Thales Underwater Systems S.A.S., Sophia Antipolis (FR)

(*) Notice: Subject to any disclaimer, the term of this patent is extended or adjusted under 35 U.S.C. 154(b) by 792 days.

(21) Appl. No.: 10/362,731

(22) PCT Filed: Aug. 31, 2001

(86) PCT No.: PCT/FR01/02716

§ 371 (c)(1), (2), (4) Date: Feb. 27, 2003

(87) PCT Pub. No.: WO02/19106

PCT Pub. Date: Mar. 7, 2002

(65) Prior Publication Data

US 2003/0174176 A1   Sep. 18, 2003

(30) Foreign Application Priority Data

Sep. 1, 2000  (FR) .................................. 00 11195

(51) Int. Cl.
*G06F 17/50* (2006.01)
(52) U.S. Cl. .................. 716/18; 716/1; 716/2
(58) Field of Classification Search ............ 716/1, 716/2, 18
See application file for complete search history.

(56) References Cited

U.S. PATENT DOCUMENTS 5,623,418 A   4/1997   Rostoker et al.

6,584,601 B1 * 6/2003 Kodosky et al. ............... 716/4

FOREIGN PATENT DOCUMENTS

EP   0 819 279 A   1/1998

OTHER PUBLICATIONS

P. Boulet et al.; "Une Approche a la SQL du Traitement de Donnes Intensif Dans Gaspard"; Recontres Francophones du Parallelisme; Jun. 8, 1999; XP002140826, p. 3, line 11 to p. 4, line 26.
De Man et al; "Cathedral II-A Computer Aided Synthesis System for Digital Signal Processing VLSI Systems"; Computer-Aided Engineering Journal, GB London; vol. 5, No. 2, Apr. 1988; pp. 55-66, XP002129437.
Bier et al; "Gabriel: A Design Environment for DSP"; IEEE Micro, US, IEEE Inc., NY;, vol. 10, No. 5, Oct. 1, 1990, pp. 28 to 45, XP000170675.

* cited by examiner

*Primary Examiner*—Thuan Do
(74) *Attorney, Agent, or Firm*—Lowe Hauptman & Berner, LLP

(57) ABSTRACT

The invention relates to a method of graphical entry for the mapping of signal processing applications, intended for a machine comprising passive resources and active resources.

Figure 1A:
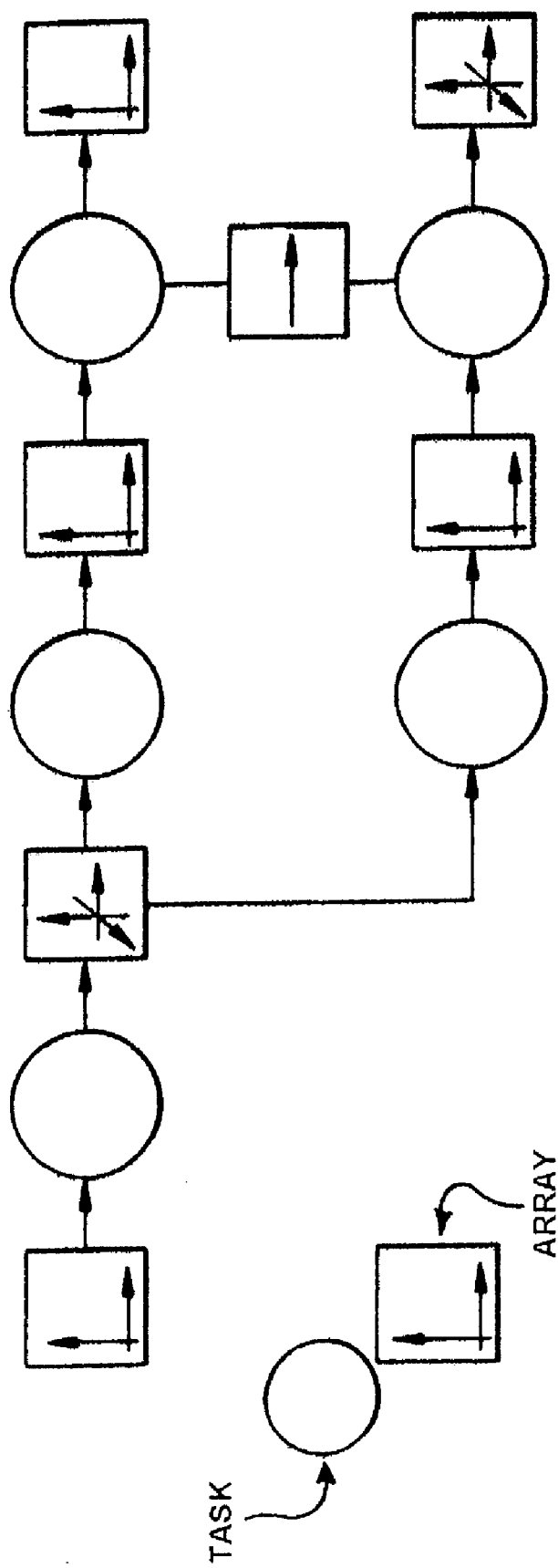

It comprises at least the following steps:
a) presenting in a first screen zone an "Archi View" portraying in the form of icons the available active or passive resources of the architecture of the machine in respect of a given level Li and the relationships between the resources, in a global model and/or in a local model,
b) constructing the signal processing application in a second screen zone forming an "Appli View", by borrowing one or more icons representative of the resources of the "Archi View",
the 2 steps a) and b) are implemented in a hierarchical manner by using ever finer successive views of the architecture of the machine.

18 Claims, 7 Drawing Sheets

PASSIVE RESOURCES

MEMORY

PERIPHERY
(FEC, DP)

ACTIVE RESOURCES

DMA

CPU

PASSIVE RESOURCES                ACTIVE RESOURCES

MEMORY

PERIPHERY
(FEC, DP)

DMA

CPU

GRAPHIC ACQUISITION METHOD FOR PLACEMENT OF SIGNAL PROCESSING APPLICATIONS

The present invention pertains to a method of graphical entry allowing the mapping of signal processing applications by using the available resources of a machine on which it is intended to be implemented.

The invention applies for example in respect of the mapping of signal processing applications as a function of the architecture of a multi SIMD machine (the abbreviation standing for Single Instruction Multiple Data).

In the particular case of the design of integrated circuits for signal processing, there exist software tools which are run on work stations and make it possible to define the constituent blocks of a chain and to specify their interconnections graphically. These tools are appropriate to a description of processing in the guise of data streams flowing between the blocks.

U.S. Pat. No. 6,020,896 describes a graphical entry method called Array-OL which makes it possible to specify applications or signal processing chains independently of any considerations regarding execution.

The method described in patent application FR 99/02 906 pertains to graphical entry in respect of the mapping of signal processing applications in a hierarchical form, in particular to a specification of the applications mimicking a levelwise description of the architecture of an SIMD machine. However, this method has the drawback of involving knowledge moreover of a description of the architecture of the machine. Another drawback is that the distribution of tasks and the mapping of the arrays in memory are not undertaken jointly.

The subject of the present invention is a graphical entry processing method allowing via a graphical tool the mapping of applications as a function of the resources of the architecture of a machine, this architecture being described also by the graphical tool.

The architectures of machines on which the application or applications will be executed may be composed of cards available commercially, called COTS (the abbreviation standing for Components On The Shelf).

The idea consists in performing the mapping of signal processing applications by using icons portraying the resources of the machine, while complying with the dependencies imposed by the topology of the interconnection of these resources.

Figure 1B:
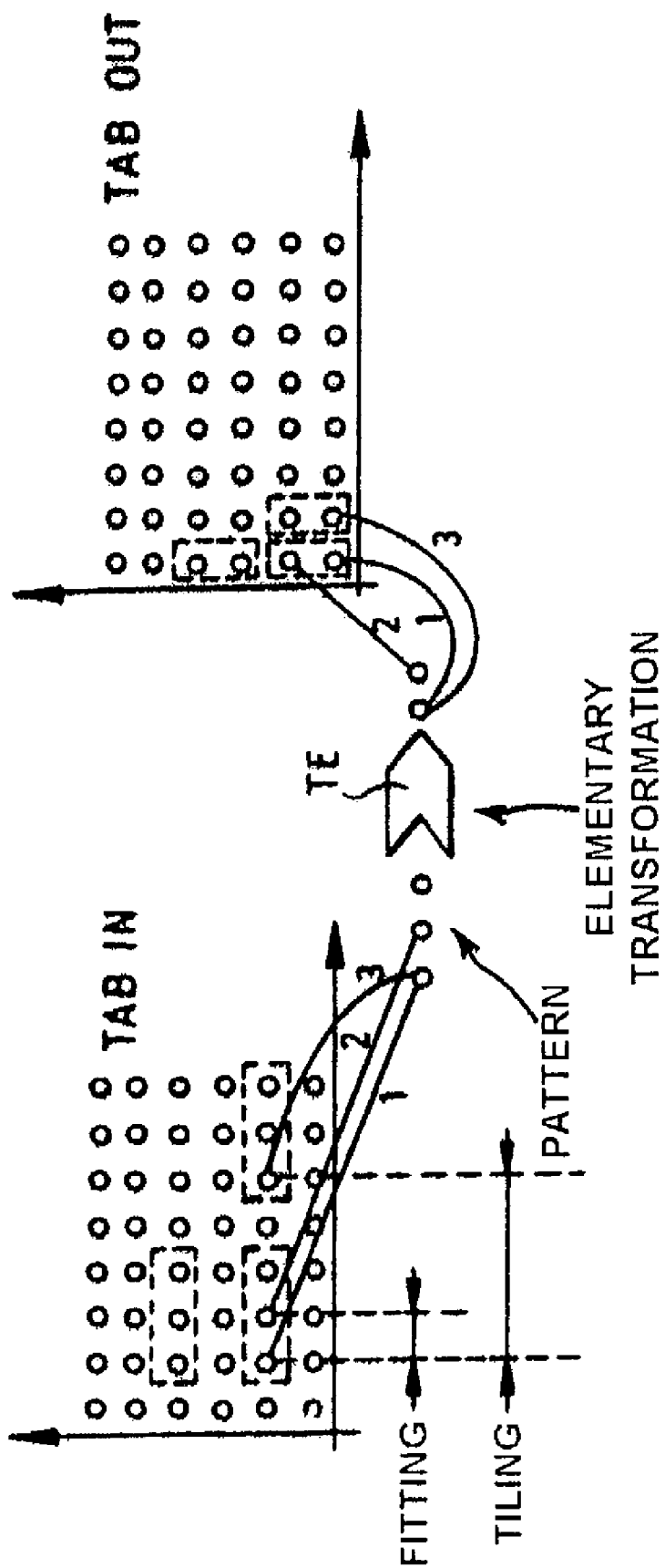

Without consideration of level of hierarchy, the specification of an application with the aforesaid "Array-OL" method calls upon two models; the Global Model and the Local Model which are described in FIGS. 1A and 1B.

An application is written from the point of view of its general organization by utilizing the global model as represented in FIG. 1A. The entire application is for example displayed in the form of a graph describing the dependencies between the various tasks via the arrays exchanged.

The Local Model described in FIG. 1B indicates thereafter for each task portrayed in the Global Model, how to build the resulting array by iteration of one and the same elementary transformation ET. It is recalled that an ET operates on restricted sets of elements called "patterns" having a given size, the elements of each of the patterns being mapped to the elements of the arrays by examples of "fitting" and of "tiling", such as are described in the aforesaid patent and patent application.

Although Array-OL does not define any specific execution schemes, these models are underpinned by paradigms of parallelism:

➤ the Global Model suggests, at the very least in the assumption of a multiplicity of physical resources, a potential parallelism of tasks, pipeline execution, each of the resources being in charge of one or more tasks;

➤ the Local Model, with its concept of multiple iterations of one and the same ET, suggests unequivocally the "Data Parallelism" synonymous with an SIMD mode of execution.

The manner of operation of a machine executing systematic signal processing can in the same way be tackled within a hierarchical picture. At the highest level, the machine can be viewed as one whole executing all the processing while consuming and producing a certain amount of data at each recurrence. Thus the architecture of a machine can be defined on several levels.

In the method according to the invention two types of resources are used:

Passive resources having a support function in relation to arrays, such as:

➤ memories appearing in the architecture of the recipient machine,

➤ producers or consumers of arrays at the periphery of the architecture, such as FEC (the abbreviation standing for Front End Conditioning) and data processing (DP). Unlike the case of memories, there is no consideration of mapping of the arrays onto these peripheral resources.

Active resources capable of reading from or writing to, in particular, the passive resources, for example:

➤ "DMAs" (the abbreviation standing for Direct Memory Access) capable of performing data transfers between at least two passive resources without modifying the data a priori (to within transcoding), ➤ "CPUs" (the abbreviation standing for Central Processing Unit), which read the data from a passive resource, modify them and then write them back to the same or to another passive resource.

Figure 2:
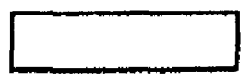
Figure 2:
Figure 2:
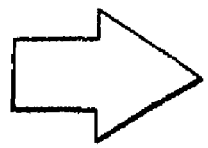
Figure 2:
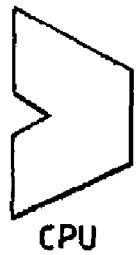

FIG. 2 shows the various graphical conventions used in the invention to distinguish these various resources.

In the subsequent description, the expression "Array-OL Appli" pertains to a method of specifying the signal processing application and the expression "Array-OL Archi" to a method of representing the architecture of the machine receiving the application.

The invention relates to a method allowing the mapping of signal processing applications on the basis of presenting the available resources of a machine intended to receive the application.

The subject of the invention relates to a method of graphical entry for the mapping of signal processing applications, intended for a machine comprising passive resources and active resources, said resources and their inter-arrangement being representable in a global model and in a local model in respect of a given hierarchical level Li of the architecture of the machine.

It is characterized in that it comprises at least the following steps:

a) presenting in a first screen zone an "Archi View" portraying in the form of icons the available active or passive resources of the architecture of the machine in respect of a given level Li and the relationships between the resources, in a global model and/or in a local model, b) constructing the signal processing application in a second screen zone forming an "Appli View", by borrowing one or more icons representative of the resources of the "Archi View", and in that the steps a) and b) are implemented in a hierarchical manner by using ever finer successive views of the architecture of the machine.

The "Archi View" presents for example icons portraying resources in the global model or icons portraying constraints of memory layout in the local model.

An active resource is decomposed for example into several (identical) elementary active resources when switching from the global model to the local model in respect of a level Li.

An active resource may be split into several active and/or passive resources when switching from the local model of a level Li to the global model of the next level Li+1.

Several identical icons are for example represented overlaid so as to indicate the number of decompositions remaining to be carried out and the number of iterations of an elementary active, resource is indicated under the icon preceded by a multiplication sign.

The borrowing of icons from the "Archi View" so as to build the application in the "Appli View" is for example performed in the following manner:

➤ an elementary task or transformation ET of the "Appli View" is represented by borrowing from the "Archi View" an icon associated with a CPU or with a DMA, ➤ an array of the "Appli View" is represented by an icon representing a passive resource such as a memory.

In the "Appli View" of the local model, the memory layout examples such as the tiling layout may be extended beyond the result array up to the icon representing the memory borrowed from the "Archi View" so as to give the memory layout of the origin of the result patterns.

The active resources are for example portrayed by two icons, an arrow representing direct memory accesses (DMA), a "V rotated by 90°" representing the computation units (CPU) and the passive resources are portrayed by two icons, a rectangle representing the memories and an open rectangle representing the peripherals.

The invention also relates to a device making it possible to construct a signal processing application intended for a machine comprising passive resources and active resources, said resources and their inter-arrangement being representable in a global model and in a local model in respect of a given level Li of the architecture of the machine. It is characterized in that it comprises at least:

➤ means suitable for presenting to a user an "Archi View" zone portraying the available resources of the architecture in respect of a given level Li and their dependencies, in a global model then in a local model, and an "Appli View" zone intended to receive the selected icons, ➤ means allowing the user ➤ to borrow one or more icons representative of an active resource or of a passive resource, ➤ to slide the said icon or icons into the "Appli View" zone so as to construct the signal processing application, and ➤ means for switching from a level Li to the next level Li+1.

The method and the device according to the invention are applied for constructing a signal processing application in the field of the processing of radar or sonar antenna signals.

The method according to the invention greatly eases mapping on machines composed of COTS whose architecture, often complex, may be formed level by level by virtue of the hierarchization peculiar to the method.

Figure 3:
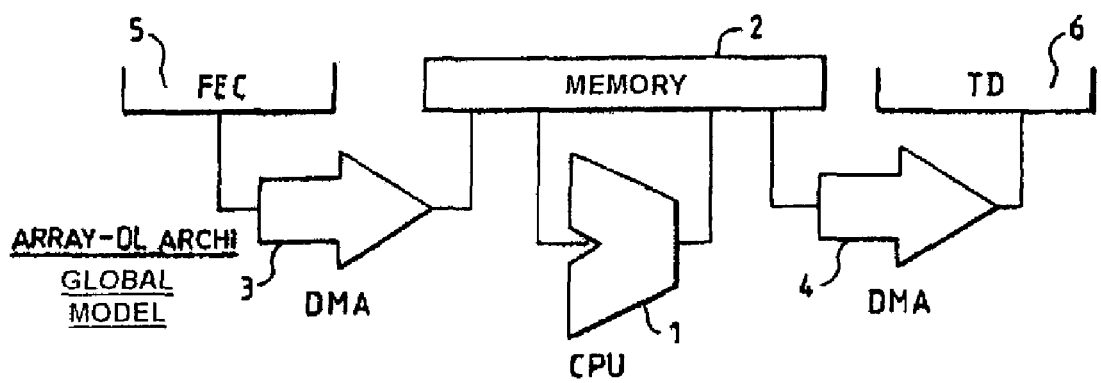
Figure 4:
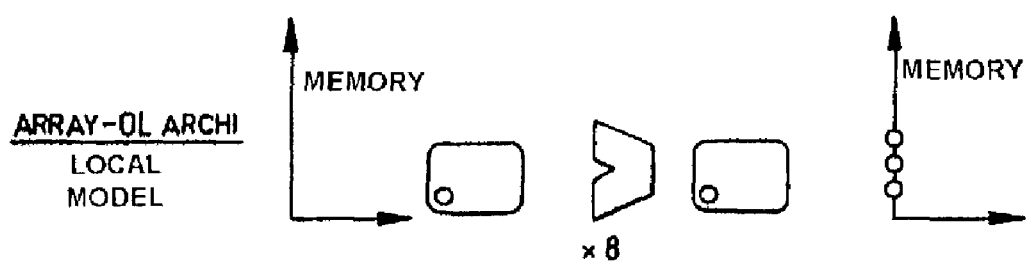
Figure 5:
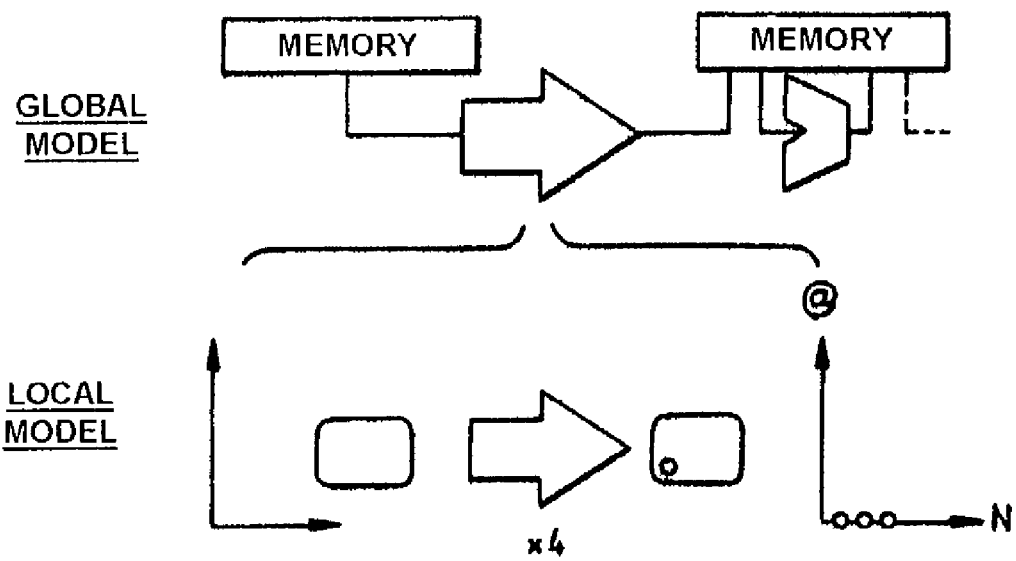
Figure 6:
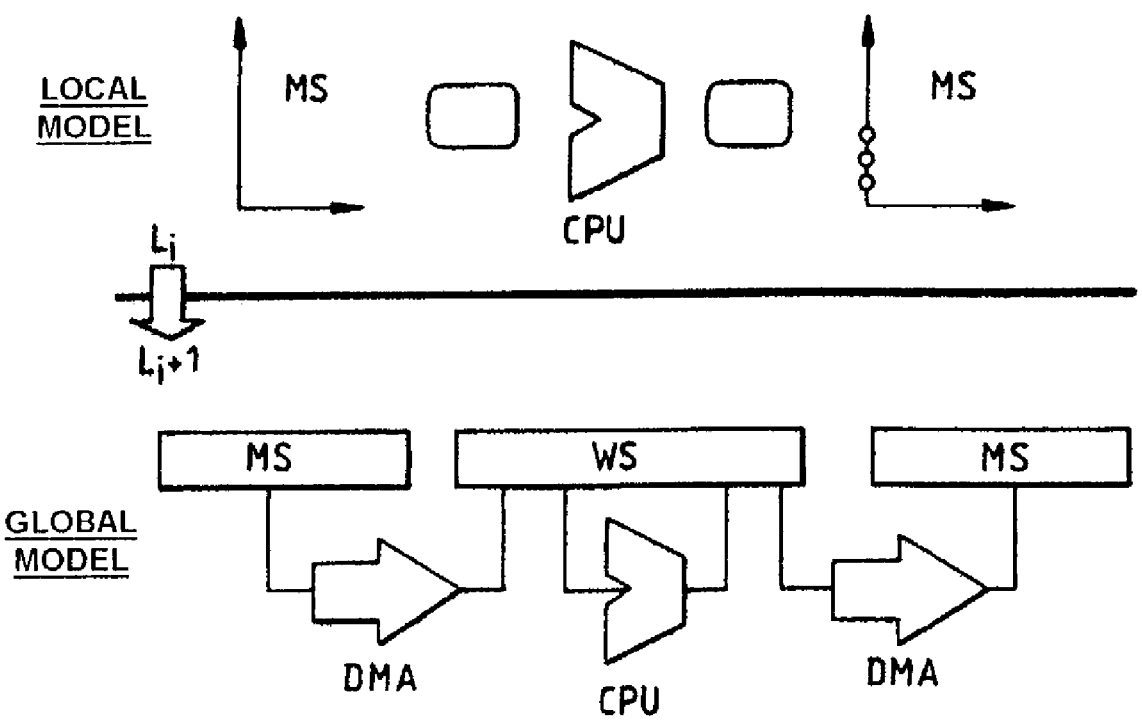
Figure 7:
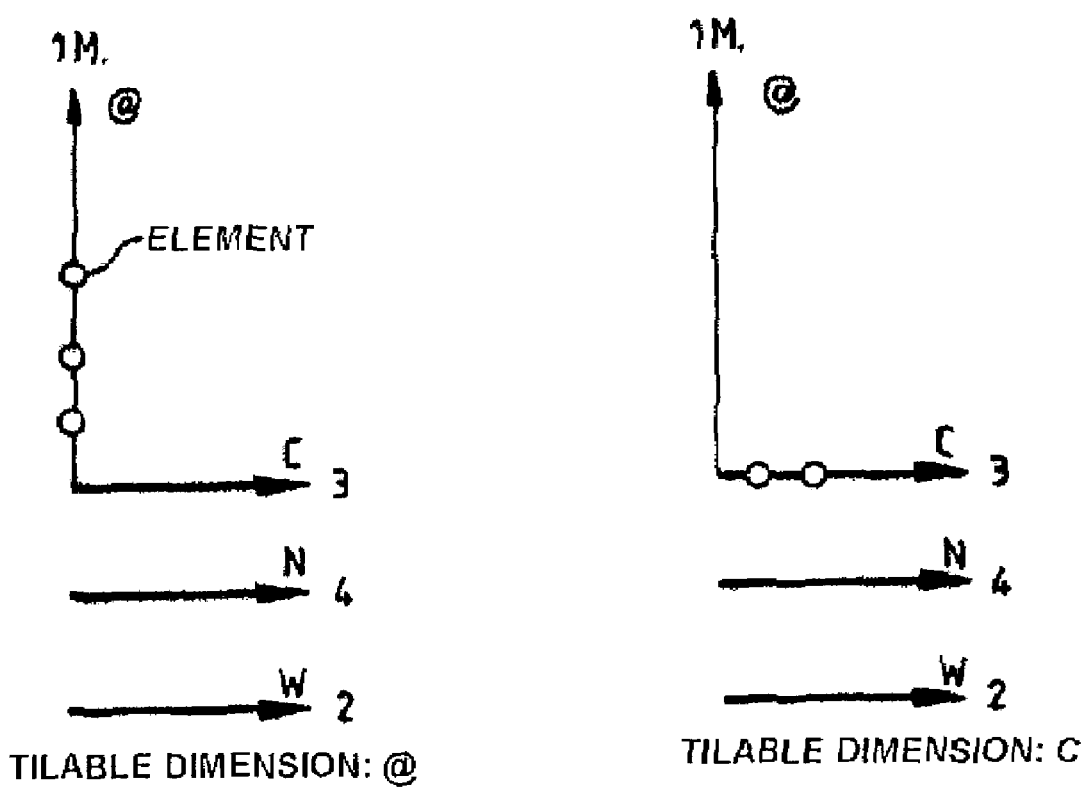
Figure 8:
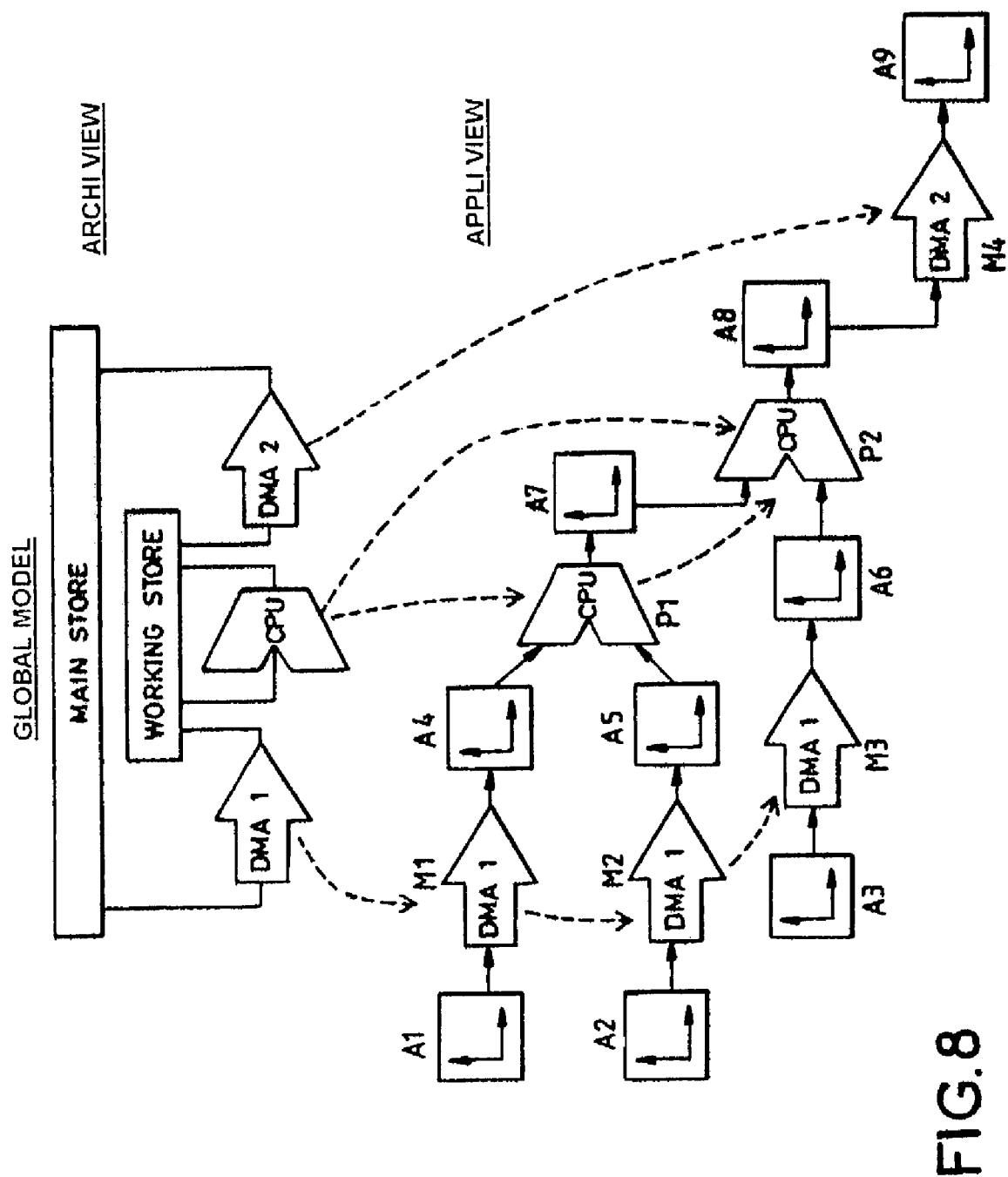
Figure 9:
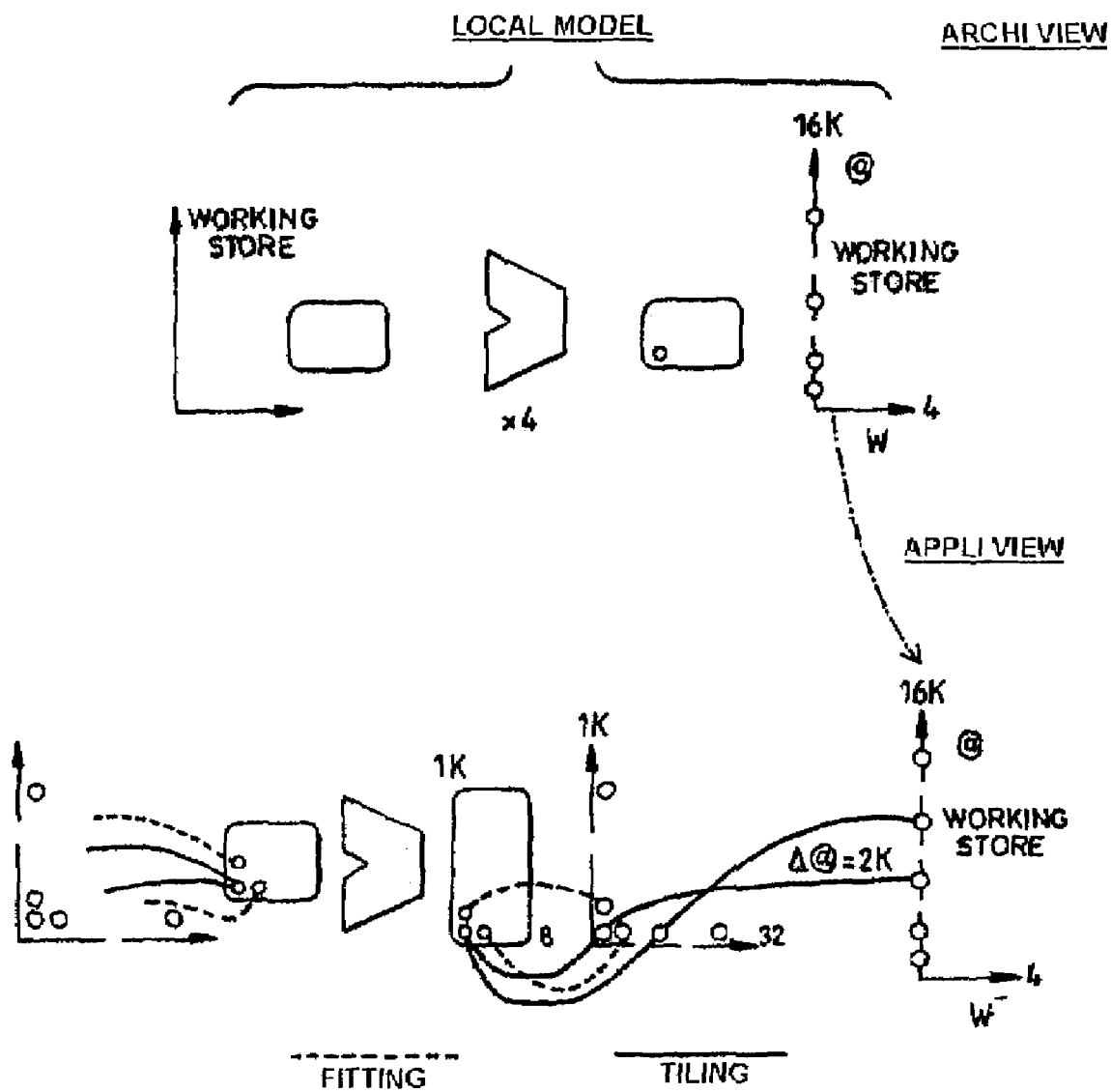

The present invention will be better understood on reading the detailed description of an embodiment taken by way of nonlimiting example and illustrated by the appended drawings in which:

FIGS. 1A and 1B respectively represent an exemplary global model and local model used in the prior art, FIG. 2 shows the graphical conventions used to distinguish the various resources implemented in the invention, FIG. 3 diagrammatically shows an exemplary arrangement of several passive and active resources of a machine in the global model, FIG. 4 shows an example of the detail of a resource of FIG. 3 using the local model, FIGS. 5 and 6 define concepts of distribution and of splitting of a resource, FIG. 7 diagrammatically shows a principle of graphical representation of a passive resource, FIGS. 8 and 9 represent an exemplary implementation of the method according to the invention in respect of a given level.

The architecture of the machine on which the application will be executed is described in a hierarchical manner over several levels, from the top level to the bottom level (known as top-down).

For each level Li the user has a partial, but sufficient, picture of the architecture for the level reached. Array-OL Archi thus makes it possible to represent for a given level Li the resources available in the global model and the local model which are comparable to those described in FIGS. 1A and 1B respectively.

FIG. 3 represents an exemplary arrangement of resources in the global model of Array-OL Archi.

For example an active resource such as a CPU, 1, is linked to a memory, 2, which supplies it with data and to which it transmits data resulting from the task carried out. The memory is itself linked to another active resource 3, 4, for example a DMA in conjunction with an FEC 5 or a DP 6.

FIG. 4 represents in the local model of Array-OL Archi a finer description of the CPU of FIG. 3 and how its activity is repeated identically on finer active resources of the same type.

Each iteration of the ET is considered to be taken on board by an elementary active resource. In the example given in FIG. 3, the ET is iterated 8 times. In order that a task may be regarded as finished in Array-OL, the ET must be repeated until all the elements of the result array or arrays are obtained, corresponding to their complete filling.

The CPU of FIG. 3 is thus decomposed into 8 identical CPUs evidencing an SIMD parallelism. The number of repetitions of the activity is indicated beneath the icon preceded for example by a multiplication sign.

According to one embodiment, the elementary active resource is represented with the aid of an icon surrounded by patterns offering the user a picture of the layout constraints depending on the memory dimensions in the form of pre-established tiling or fitting by applying the procedure described in the aforesaid U.S. Pat. No. 6,020,529.

The user thus accesses the details of the architecture of the machine as he drops down through the levels Li of the hierarchy.

In the subsequent description:

the term "distribution" corresponds to the decomposing of an active resource into several elementary active resources when switching from the global model to the local model. FIG. 5 diagrammatically shows the distribution of a DMA into four DMAs corresponding to the 4 iterations of the elementary transformation of the application. This spatial distribution may also be applied to a temporal distribution (not represented in the figures) by considering the repetition over time of the resource. The choice between these two distributions is made by the user as a function of the machine and of the application in particular of the size of the memories.

the term "splitting" corresponds to the decomposing of an active resource into multiple resources which are generally different when switching from the local model of a level Li to the global model of the next level Li+1. FIG. 6 represents an exemplary distribution of a simple CPU in the local model of level Li into a set composed of a CPU, of two DMAs, of a work memory (WS).

The convention adopted in the diagrams to indicate the composite nature of a resource is to overlay several identical icons. The number of identical icons appearing to the user give an indication as to the number of splittings or of distributions which are possible before arriving at the last level of decomposition.

The number of overlaid icons is decreased by one with each switch from the global model to the local model for one and the same level Li (FIG. 5), and with each splitting when switching to the next level (FIG. 6).

For a given level of architecture Li, the global model of Array-OL Archi specifies the interconnection of an active resource to one or more passive resources and in particular with memories. This model offers a first item of "mapping" information by designating the memories into which the array produced by the active resource can be mapped.

The local model of Array-OL Archi will make it possible to indicate which memory dimension can actually be "tiled" in respect of the relevant level.

A memory appearing for the first time in the hierarchy has for example several dimensions including:

an address dimension @,

Card (C), Node (N), Bank (B) dimensions etc. indicative of a dispersed organization (distributed alias) of this memory, a width dimension (w) if in one and the same cycle of access by an active resource several words are read from or written to the same bank.

FIG. 7 represents a synopsis of all the dimensions with, for example, an indication as to the number of words contained by the-tilable dimensions.

The number of dimensions that are presented to the user decreases on dropping down through the levels of the architecture of the machine. Once used for a distribution in a level, a physical dimension such as C, N or B no longer appears in the following levels. Only the address dimension @ remains in the lowest level of the hierarchy.

The convention adopted to indicate, on the memory icon, which is the only tilable dimension, consists in having elements portrayed on this dimension alone.

In an exemplary implementation of the method, the screen of the work station presents to the user an "Archi View" zone from which is displayed a level Li of architecture of the machine together with its icons representative of the available resources, in a global or local model, and an "Appli View" zone intended to receive the icons that will form the application in the Array-OL Appli formalism. These two zones take the form, for example, of a window on the screen comprising a menu bar making it possible to select the global model, the local model, the possible recording of the configurations defined, the exploring of the various levels Li of the architecture of the machine.

FIGS. 8 and 9 diagrammatically show an exemplary implementation of the method at a given level Li according to the invention. The dashed arrows correspond to the movements of various icons, available in the Archi View which is displayed on the screen, performed by the user by means of a mouse for example.

The icons displayed correspond to the resources of the architecture together with the details corresponding to the level Li reached in the hierarchy of the architecture. Shown diagrammatically at the bottom of FIGS. 8 and 9 is the Appli View.

The borrowing of certain icons portraying the active resources of the global model and passive resources of the local model from the Archi View in order to construct the Appli View constitutes a mapping formalism according to the following conventions:

a task represented in the global model of the Appli View by borrowing a CPU icon (respectively a DMA icon) from the Archi View corresponds to a processing task (respectively transfer task) executing on the CPU (respectively DMA), the arrays viewed at input and at output by this task are stored on the read and write memories of this CPU icon (or DMA icon), as indicated by the Archi View, the examples of tiling, and possibly of fitting, entered into the local model of the Appli View on the result side and extended up to the icon representing the write memory in the local model of the Archi View, constitute the mapping directives dependent on the memory dimension considered by the level.

FIG. 8 represents an example of entering information into the global model. The active resources of the Archi View serve to build a graph of tasks in the Appli View. This graph comprises several transfer tasks M1, M2, M3 taken on board by DMA1, M4 by DMA2 and processing tasks P1 and P2 taken on board by the CPU.

In this exemplary construction of the application, the resources DMA1 and CPU have been borrowed three times and twice respectively, and dropped down into the screen zone reserved to construct the Appli View. The relationships between active and passive resources of the Archi View make it possible to deduce that in the Appli View the arrays A1, A2, A3 and A9 are stored in the "Main Store" memory and the arrays A4, A5, A6, A7 and A8 in the "Working Store" work memory.

FIG. 9 represents the entry of information relating to mapping in the local model corresponding to the task P1 of FIG. 8.

The CPU is here decomposed into four identical elementary CPUs reading from and writing to the "Working Store" work memory.

Consequently, the ET of the Appli View must be iterated 4 times to produce the result array completely. The "Working Store" passive resource is borrowed from the Archi View and dropped down into the Appli View. In this way, the memory is designated if several write memories are available to the resource.

The tiling examples are extended beyond the array up to the Working Store to give the memory layout of the origin of the result patterns. Thus, at each level, task distribution and mapping of arrays in memory are undertaken jointly.

The method in its entirety is executed beginning with the highest level in the hierarchy and in the global model. The implementation is then carried out for each level as far as the lowest level by implementing the following steps:

step a): the user positions himself via the menu at a given level Li in the hierarchy and in the global model. Icons representative of the active and passive resources and of their dependencies in respect of level Li are therefore available to him on the screen in the "Archi View" zone, step b): he selects by means of the mouse for example the icon or icons representative of the passive and active resources which are necessary to construct his application in the corresponding level Li, and he transfers this or these icons into the "Appli View" zone with the aid of the mouse, he repeats this step b) as many times as necessary to obtain a view of the application in the global model in this level Li, step c), he remains at the same level Li of the hierarchy of the architecture and selects the local model from the menu of the "Archi View" zone thereby making available to him icons associated with a resource of the global level with more details and by selecting the detailed icons corresponding to the icons previously selected in step b), enabling him to construct the application in the local model, by a transfer with the aid of the mouse the icon selected from the "Archi View" zone to the "Appli View" zone.

step c) is reiterated to obtain all the resources of the global model which are specified by step b) in the local model (thereby making it possible to switch from level Li to level Li+1).

The final result is stored for example in the memory of a work station allowing the mapping of the application onto the recipient machine.

The invention claimed is:

1. A method of graphical entry for the mapping of signal processing applications, intended for a machine including passive resources and active resources, the resources and their inter-arrangement being representable in a global model and in a local model in respect of a given hierarchical level of the architecture of the machine, comprising the following steps:

a) displaying and presenting in a first screen zone portraying in the form of icons the available active and passive resources of the architecture of the machine in respect of a given level and the relationships between the resources, in a global model and/or in a local model, b) displaying and constructing the signal processing application in a second screen zone, by borrowing an icon from the first screen zone wherein steps a) and b) are implemented in a hierarchical manner by using ever finer successive views of the architecture of the machine.

2. The method as claimed in claim 1, wherein the first screen zone presents icons portraying resources in the global model or icons portraying constraints of memory layout in the local model.

3. The method as claimed in claim 2 wherein the borrowing of icons from the first screen zone so as to build the application in the second screen zone is performed by:

representing an elementary task or transformation of the first screen zone is represented by borrowing from the second screen zone an icon associated with a CPU or with a DMA, representing an array of the second screen zone is represented by an icon representing a passive resource such as a memory.

4. The method as claimed in claim 2 wherein in the second screen zone of the local model, the memory layout examples such as the tiling layout are extended beyond the result array up to the icon representing the memory borrowed from the first screen zone so as to give the memory layout of the origin of the result patterns.

5. The method as claimed in claim 2 wherein the active resources are portrayed by two icons, an arrow representing direct memory accesses (DMA), a V rotated by 90° representing the computation units (CPU) and in that the passive resources are portrayed by two icons, a rectangle representing the memories and an open rectangle representing the peripherals.

6. The method as claimed in claim 1, wherein an active resource splits into several active and/or passive resources when switching from the local model of a level to the global model of the next level.

7. The method as claimed in claim 6 wherein the borrowing of icons from the first screen zone so as to build the application in the second screen zone is performed by:

representing an elementary task or transformation of the first screen zone is represented by borrowing from the second screen zone an icon associated with a CPU or with a DMA, representing an array of the second screen zone is represented by an icon representing a passive resource such as a memory.

8. The method as claimed in claim 6 wherein in the second screen zone of the local model, the memory layout examples such as the tiling layout are extended beyond the result array up to the icon representing the memory borrowed from the first screen zone so as to give the memory layout of the origin of the result patterns.

9. The method as claimed in claim 6 wherein the active resources are portrayed by two icons, an arrow representing direct memory accesses (DMA), a V rotated by 90° representing the computation units (CPU) and in that the passive resources are portrayed by two icons, a rectangle representing the memories and an open rectangle representing the peripherals.

10. The method as claimed in claim 1, wherein the borrowing of icons from the first screen zone so as to build the application in the second screen zone is performed by:

representing an elementary task or transformation of the first screen zone is represented by borrowing from the second screen zone an icon associated with a CPU or with a DMA, representing an array of the second screen zone is represented by an icon representing a passive resource such as a memory.

11. The method as claimed in claim 1, wherein, in the second screen zone of the local model, the memory layout examples such as the tiling layout are extended beyond the result array up to the icon representing the memory borrowed from the first screen zone so as to give the memory layout of the origin of the result patterns.

12. The method as claimed in claim 1, wherein the active resources are portrayed by two icons, an arrow representing direct memory accesses (DMA), a V rotated by 90° representing the computation units (CPU) and in that the passive resources are portrayed by two icons, a rectangle representing the memories and an open rectangle representing the peripherals.

13. The method as claimed in claim 1 for constructing a signal processing application in the field of the processing of radar or sonar antenna signals.

14. The method as claimed in claim 1 wherein the several elementary active recourses are identical.

15. The method as claimed in claim 1 wherein the borrowing of icons from the first screen zone so as to build the application in the second screen zone is performed by:
   representing an elementary task or transformation of the first screen zone is represented by borrowing from the second screen zone an icon associated with a CPU or with a DMA,
   representing an array of the second screen zone is represented by an icon representing a passive resource such as a memory.

16. The method as claimed in claim 1 wherein in the second screen zone of the local model, the memory layout examples such as the tiling layout are extended beyond the result array up to the icon representing the memory borrowed from the first screen zone so as to give the memory layout of the origin of the result patterns.

17. A device making it possible to construct a signal processing application intended for a machine including passive resources and active resources, the resources and their inter-arrangement being representable in a global model and in a local model in respect of a given level of the architecture of the machine, comprising:
   means suitable for displaying and presenting to a user a zone portraying the available resources of the architecture in respect of a given level and their dependencies, in a global model then in a local model, and a first zone intended to receive the selected icons, means allowing the user to borrow one or more icons representative of an active resource or of a passive resource, and
   to move the icon into a second zone to be displayed so as to construct the signal processing application, and
   means for switching from a level to next level to be displayed.

18. The device as claimed in claim 17 for constructing a signal processing application in the field of the processing of radar or sonar antenna signals.

* * * * *